March 12, 1968        R. J. MOORE        3,372,688

LOCKABLE COMBINATION OF COOKING GRATE AND VESSEL

Filed July 5, 1966        3 Sheets-Sheet 1

INVENTOR.
ROLAND J. MOORE
BY
Leonard H. King
ATTORNEY

March 12, 1968  R. J. MOORE  3,372,688
LOCKABLE COMBINATION OF COOKING GRATE AND VESSEL
Filed July 5, 1966  3 Sheets-Sheet 2
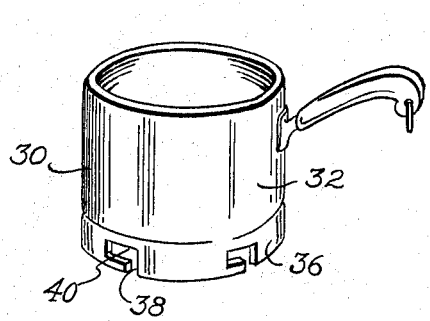
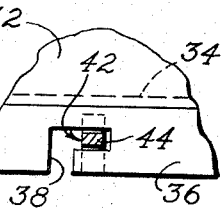
FIG. 5A  FIG. 5B
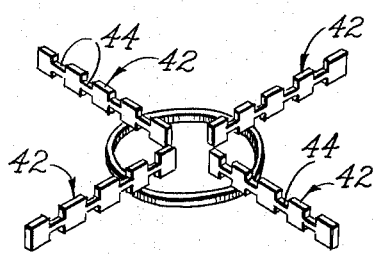
FIG. 4
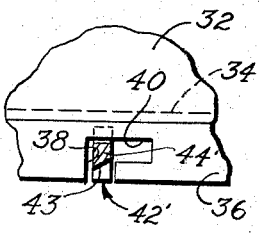
FIG. 5C  FIG. 5D
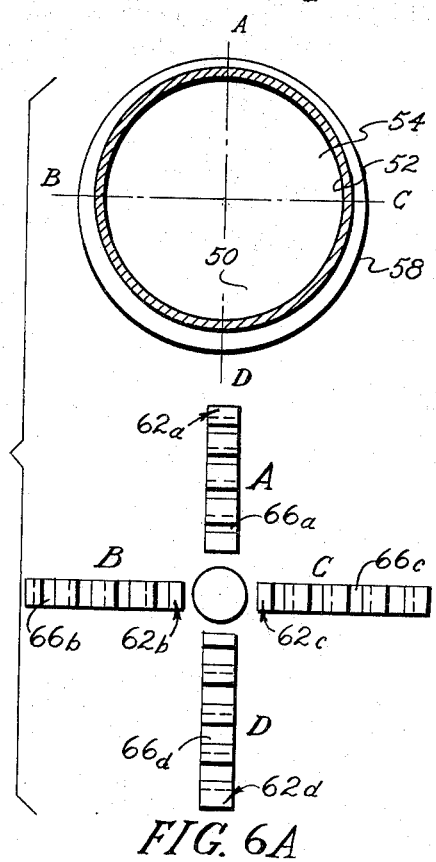
FIG. 6A
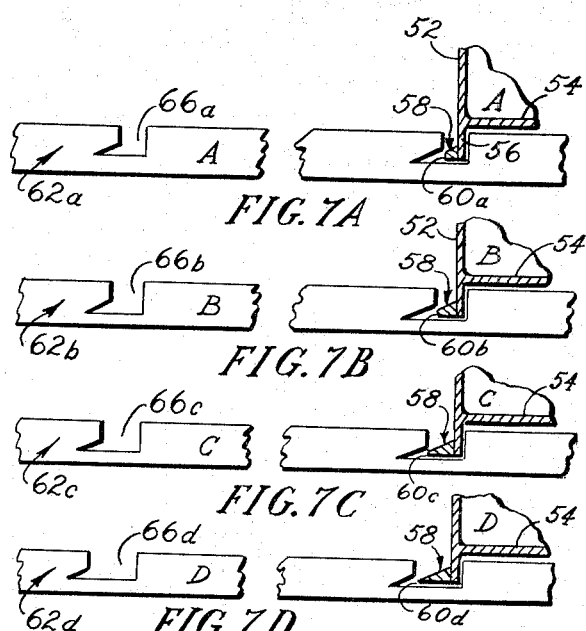
FIG. 7A
FIG. 7B
FIG. 7C
FIG. 7D
INVENTOR.
ROLAND J. MOORE
BY
Leonard H. King
ATTORNEY March 12, 1968    R. J. MOORE    3,372,688
LOCKABLE COMBINATION OF COOKING GRATE AND VESSEL
Filed July 5, 1966    3 Sheets-Sheet 3

INVENTOR.
ROLAND J. MOORE
BY
Leonard H. King
ATTORNEY

United States Patent Office 3,372,688
Patented Mar. 12, 1968

3,372,688
LOCKABLE COMBINATION OF COOKING
GRATE AND VESSEL
Roland J. Moore, 104—23 113th St.,
Richmond Hill, N.Y. 11418
Filed July 5, 1966, Ser. No. 562,844
18 Claims. (Cl. 126—24)

ABSTRACT OF THE DISCLOSURE

An interlocking cooking utensil and grate for use on stoves.

---

This invention relates generally to cooking vessels and grates associated therewith and more particularly to means for removably retaining the vessel on the grate.

There are many instances where it is desirable to removably lock the cooking utensil on to the grill while the food is being prepared. Devices of this type prohibit inadvertent spilling of the contents by children and, even more important, prevents the utensil from falling off if the range is made unstable.

The present invention has great utility in marine vehicles, aircraft, and train galleys where cooking is frequently done while the vehicle is in motion. It is extremely hazardous if a utensil, having scalding contents, for example, is dislodged from the range as a result of a ship rocking, for example. The same would hold true, of course, in airplanes encountering turbulent weather or in trains rounding bends and the like.

Attempts have been made to solve the problem of cooking vessels spilling while the vehicle is in motion. One such example of the prior art is U.S. Patent No. 2,878,803, issued on Mar. 24, 1959, to T. A. Del Papa. Therein is disclosed a grate having an elongated central member provided with a pair of keyhole slots set at an angle to each other. The cooking utensil is formed with a diametric recess on the underside thereof which also includes a number of headed pins extending downwardly from the recess. The elongated member on the range is first engaged by the recess under the utensil whereby the pins are disposed in the enlarged portion of the keyhole apertures. The utensil is then rotated counterclockwise so that the shank of the pins enters the narrow section of the keyholes with the heads of the pins beneath the elongated member of the grill.

While the aforementioned patent has many advantageous features, there are certain other areas that warrant improvement. The utensil may be inadvertently rotated in the wrong direction by someone inexperienced with the device. The pins could easily be bent and rendered inoperative. It is also possible to try to force the utensil angularly beyond its stop position whereby the pins could be sheared off. It should also be noted that the patented device can be positioned on the range with the handle in only one position. Conceivably, the handle could extend outwardly beyond the range creating a hazard. This may also represent some inconvenience for lefthanded people.

Another disadvantage of the patented device is that the pins are on the underside of the utensil and are therefore difficult to see. It is awkward to locate the pins in the keyhole apertures since the pins are concealed. It is apparent that if the utensil is filled and very heavy, it is undesirable to have to juggle the device in order to seat the pins in the apertures. Finally, because of the construction illustrated in the Del Papa patent, the cooking utensil would in all probability have a bottom surface that is not flat. Because of the diametric and upwardly extending ridge in the bottom surface of the utensil, it would be difficult to stir the contents. There may also be some difficulty in cleaning the device. If, on the other hand, the bottom surface of the utensil is thickened in two areas to define a longitudinal recess, then the utensil will not be practical for cooking because of improper heat dissipation. This alternative structure would also add considerably to the manufacturing cost.

By way of contrast, the present invention employs a cooking utensil that is conventional in all respects except for the addition of a downwardly depending skirt around the periphery, thereof. Various embodiments will illustrate and describe different means for locking the utensil on grates of novel configuration.

In one example of this invention, a horizontal flange extending outwardly from the bottom of the skirt is provided with several angularly spaced notches. The cooperating grate bars are each provided with several L-shaped notches so that the utensil may be placed thereon with the notches of the utensil and the grate in engagement with each other. By rotating the utensil somewhat less than 45°, the unnotched portions of the utensil flange will be captured in the L-shaped notches of the grate.

A second embodiment provides L-shaped notches in the skirt of the utensil. The notches engage reduced cross sections in the cooperating grate and are locked thereon by a small angular movement of the utensil. In both of the first two embodiments, a plurality of spaced notches are provided in each grate in order to accommodate utensils having different diameters.

A third embodiment provides a tapered flange having a gradually increasing thickness. The substantially L-shaped notches in the grates, for any particular diameter utensil, have similar dimensions to the flange of the utensil. By inserting the flange into the notches and rotating the utensil, the wedging action will be achieved. It should be noted that the wedging action may also be provided for the second embodiment by either providing a taper on the utensil notches or a taper on the reduced sections of the grate.

Finally, a fourth embodiment provides an outwardly flared skirt in which depressions are formed at suitable intervals. As an alternative construction, the skirt in this embodiment may be provided with a plurality of angularly spaced, outwardly extending bumps. The grate is formed with an irregularly shaped slot that will accept either the depressions or the bumps in the skirt in the unlocked condition of the utensil and, upon rotation of the utensil, will cause a wedging action with the portion of the skirt between the depression or bumps.

Accordingly, it is an object of this invention to provide improved locking means between a cooking utensil and a grill on which the utensil is placed.

Another object is to provide means for removably locking a utensil on a grill at the periphery of the utensil.

Still another object is to provide a cooking utensil having a downwardly depending skirt having locking means cooperating with the grates of the range.

A further object is to provide means for locking the cooking utensil onto a grill by a wedging action.

Still another object is to provide means for locking a utensil onto a grill by a quarter-turn of the utensil.

Yet another object is to provide cooperating keys and keyways on a cooking utensil and grill whereby the articles are removably locked to each other.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

In the drawing:

FIG. 4 is a perspective exploded view of the second embodiment of this invention.

FIG. 5A is a fragmentary sectional elevational view of the second embodiment shown in the unlocked condition.

FIG. 5B is a view similar to FIG. 5A showing the device in a locked condition.

FIG. 5C is a fragmentary elevational view of an alternative construction that may be used with the FIG. 4 embodiment.

FIG. 5D is a fragmentary perspective view of still another alternative construction for the FIG. 4 embodiment.

FIG. 6 is a sectional plan view of the cooking utensil used in still another embodiment of this invention.

FIGS. 7A–7D are fragmentary sectional elevational views showing the locking arrangement of the device of FIG. 6.

Figure 1:
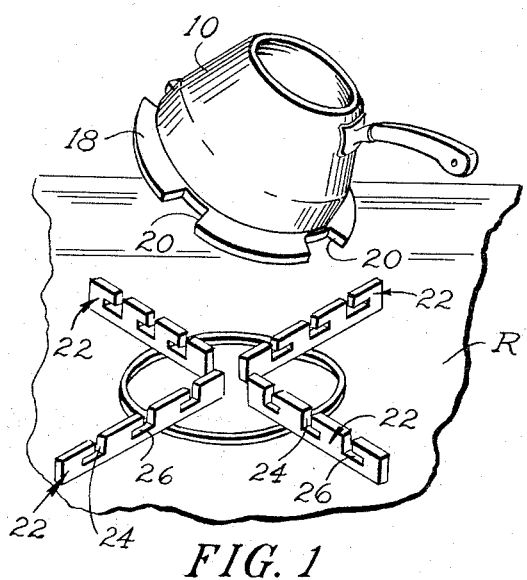
FIG. 1 is a pictorially exploded view of one embodiment of this invention.

Referring now to FIGS. 1 to 3B, a utensil 10 is shown together with a cooking range R. An open saucepan is used by way of illustration, although it is to be clearly understood that the present invention may be adapted to any cooking utensil, such as a teapot, a frying pan, etc.

Utensil 10 is provided with an upstanding peripheral wall 12 and a flat recessed bottom surface 14. Because of the relationship of the peripheral wall and the bottom surface, there is defined an annular skirt 16. An outwardly extending flange 18 is provided on the bottom of the skirt and includes several angularly spaced notches 20. In the embodiment illustrated, there are four equally spaced notches adapted to cooperate with four equally spaced grate members 22, as will now be described.

Each grate extends radially outward from the center of the burner (not shown). The grates are each provided with a number of notches comprised of a vertical portion 24 and a horizontal portion 26. Depending upon the size of the utensil, one set of notches will be used to releasably lock the utensil in place. It will be seen that the skirt portion is received by the vertical section 24 of the notch, while the flange 18 is received in the horizontal portion 26 of the notch.

Figure 2A:
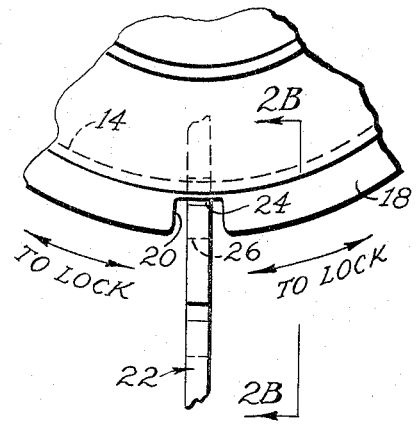
FIG. 2A is a fragmentary plan view of a portion of the FIG. 1 embodiment shown in the unlocked position.
Figure 2B:
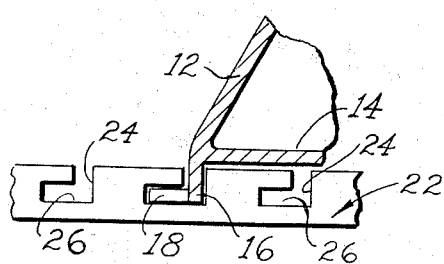
FIG. 2B is a fragmentary sectional elevational view taken along lines 2B—2B of FIG. 2A.
Figure 3A:
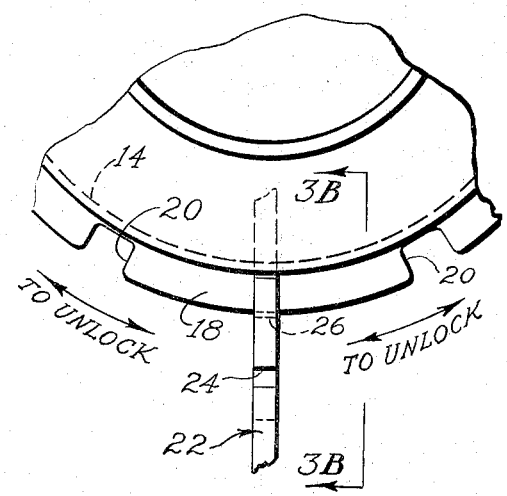
FIG. 3A is a fragmentary sectional plan view showing the FIG. 1 embodiment in a locked position.
Figure 3B:
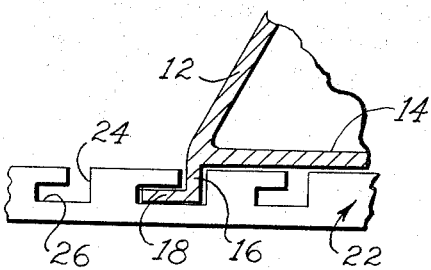
FIG. 3B is a fragmentary sectional elevational view taken along line 3B—3B of FIG. 3A.

In the unlocked position, shown in FIG. 2A, the notched portions 20 of the flange 18 are placed over the appropriate notches in the grates so that the skirt freely enters vertical opening 24. The utensil is then rotated through an angle somewhat less than 90° so that the notches 20, as shown in FIG. 3A, are disposed intermediate the grates and the full portion of the flange 18 is captured in the horizontal section 26 of the grate notches. In this manner the utensil cannot be raised upwardly unless it is once again rotated so that the notches 20 line up with the grates. The L-shaped construction of the notches in the grate holds the utensil securely in place.

Referring now to FIG. 4, there is shown an alternative embodiment of the present invention. Utensil 30 includes an upwardly extending peripheral wall 32 having an integral, flat bottom surface 34 that is recessed. An annular skirt 36 extends downwardly from the underside of bottom surface 34. In this embodiment, a plurality of downwardly facing L-shaped notches, each having a vertical portion 38 and a horizontal portion 40, are formed in angularly spaced relationship about the skirt 36.

A plurality of grate members 42 are provided with several reduced cross section areas 44. The utensil is assembled to the grate by positioning the vertical portion 38 of the notches over a particular set of reduced sections 44. This unlocked condition is shown in FIG. 5A. To lock the utensil onto the grates, as shown in FIG. 5B, it is necessary only to rotate the utensil through a very short arc. This rotation will cause the horizontal section 40 of the notch to engage the reduced cross section 44 of each grate. It will be seen that because of the inverted L-shaped construction, the utensil as shown in FIG. 5B cannot be lifted unless it is rotated back to its original position.

As an alternative arrangement to the FIG. 4 embodiment, notches having non-parallel walls may be formed in the skirt to provide a wedging action when the utensil is rotated from the unlocked to the locked positions (FIG. 5C). At least one side 46 of horizontal notch portion 40' is formed at an angle to the opposite wall. When the utensil is rotated, the reduced cross section of the grate will wedge itself into the angularly positioned horizontal notch. In the embodiment of FIG. 5C, prime numbers are used to denote generally similar elements. In the embodiment of FIG. 5D the grates 42' are provided with an inclined base wall 43 in the transverse slots that define the reduced cross section areas 44'.

FIG. 6 and FIGS. 7A–7D illustrate another embodiment of the present invention. Utensil 50 is provided with an upstanding peripheral wall 52 and a substantially flat base portion 54 integral with the wall. An annular skirt 56 extends downwardly from the base wall 54 which is thereby recessed. An outwardly extending flange 58 having a uniformly changing trapezoidal cross section 60a–60d is provided about the lower portion of the skirt. In this embodiment each of the four grates, 62a–62d, are provided with a plurality of notches having a trapezoidal section 64a–64d and an upwardly opened vertical section 66a–66d. As may best be seen in FIGS. 7A through 7D, the two sections of each notch change in area in accordance with the change in volume of the flange 58. Thus points A–D, as shown in FIG. 6, illustrate the unlocked position of the utensil as it is applied to the range. When the utensil is rotated in either angular direction the increasing thickness of the flange is forced into the nonchanging openings in the grates. The resulting wedging action assures that the utensil will be firmly locked in place. As in the previous embodiment, each of the grates is provided with a plurality of notches of a given dimension in order to accommodate a range of utensil sizes.

FIGS. 8 and 9A–9C illustrate still another embodiment of this invention. Utensil 70 is provided with an upstanding peripheral wall 72 and a substantially flat horizontal base section 74 integral therewith. Annular, outwardly flared skirt 76 extends downwardly from the recessed base section and is provided with a plurality of angularly spaced, inwardly formed depressions 78.

The grates 80 for this embodiment are each provided with a number of upwardly opened slots 82 each having a sloping wall 84. The slots therefore are narrower at the top than at the bottom. The depressed portions 78 of skirt 76 are received in the narrower portion of the slot (FIG. 9A and FIG. 9C) when the utensil is placed on the grate. FIG. 9C illustrates this condition on an enlarged scale. As the utensil is rotated to the locked position (FIG. 9B and FIG. 9D), the outwardly flared portion of the skirt between the depressions is brought to bear against the sloping wall 84 of the slots, thereby preventing the utensil from being lifted. This condition is shown in enlarged, fragmentary view FIG. 9C. As in all of the previous embodiments, each grate is provided with a number of slots spaced radially from their theoretical central juncture in order to accommodate a range of cooking utensil sizes.

Figures 8, 9A:
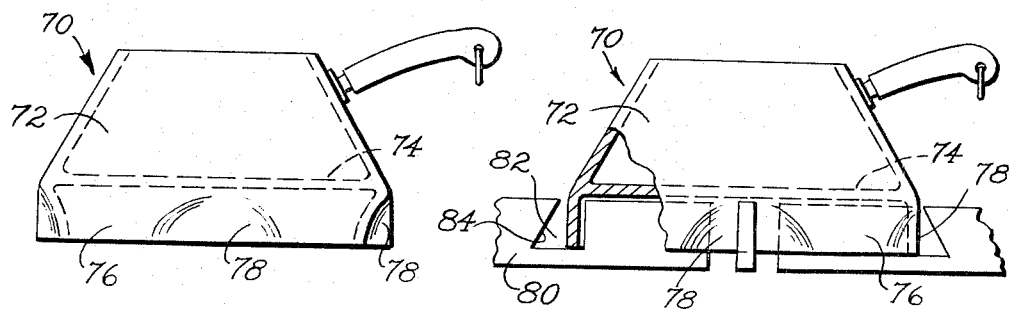
FIG. 8 is an elevational view of the utensil used with still another embodiment of this invention.
FIG. 9A is an elevational view partly broken away illustrating the FIG. 8 apparatus in the unlocked condition.
Figure 9B:
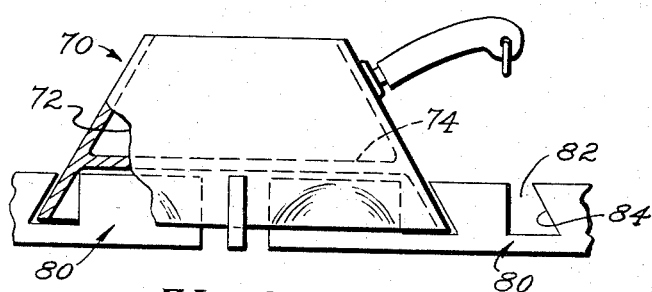
FIG. 9B is a view similar to FIG. 9A showing the apparatus in the locked position.
Figure 10A:
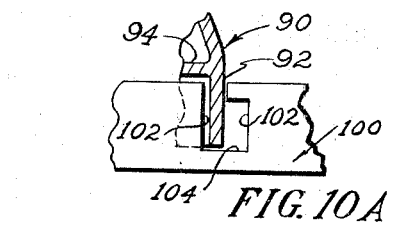
FIGS. 10A and 10B are elevational views of still another alternative embodiment of this invention in the unlocked and locked conditions, respectively.
Figure 10B:
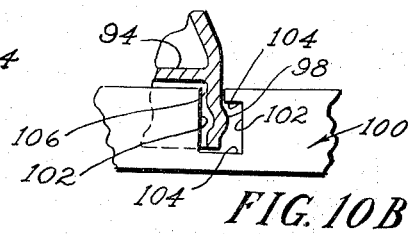
Figure 9C:
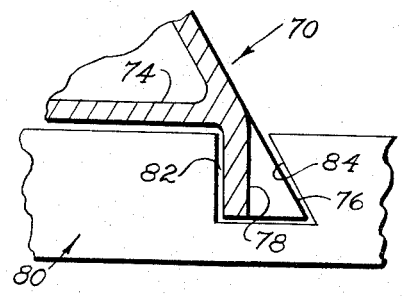
FIGS. 9C and 9D are enlarged fragmentary sectional elevational views of the unlocked and locked conditions of this embodiment on an enlarged scale.
Figure 9D:
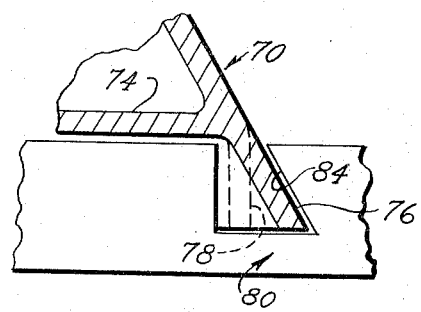

A variation of the embodiments shown in FIG. 6 and FIG. 8 is illustrated fragmentarily in an unlocked condition in FIG. 10A and in a locked condition in FIG. 10B. The utensil 90 includes a side wall 92, a recessed base wall 94 and a peripheral skirt 96 extending downwardly from the base wall. A plurality of outwardly extending bumps 98 are formed on the skirt portion of the utensil. Grates 100 include a number of upwardly open transverse slots each having a pair of spacedly opposed vertical walls 102, and a pair of spacedly opposed horizontal walls 104. The slot opening 106 is smaller than the space between the vertical walls 102. The utensil is removably locked to the grate in the same manner as the previously described embodiments.

By means of novel structure, the combination hereinbefore described provides important safeguards in the use of a cooking utensil, particularly one that is used on board a moving vehicle. The cooking utensil is firmly locked but easily removed by less than a quarter turn thereof. The locking action takes place on the periphery of the utensil and is effected in the several embodiments described by either clockwise or counterclockwise displacement of the utensil. In each embodiment a skirt is provided below the recessed bottom of the utensil and the skirt is provided with interlocking means cooperating with novel forms of cooking grates. Accordingly, the combination may be used with equal facility by either right or lefthanded individuals. The handle may be placed in a safe position that does not overhang the edge of the stove and if further safety precautions are desired, a wedging action between the utensil and the grate may be included.

There has been disclosed heretofore the best embodiment of the invention presently contemplated and it is to be understood that various changes and modifications may be made by those skilled in the art without departing from the spirit of the invention.

What is claimed is:

1. In combination, an interlocking cooking utensil and grate for use on a stove having heating means, said combination comprising:
   (a) a cooking utensil characterized by a recessed bottom wall and a peripheral skirt extending downwardly therefrom, said utensil being rotatable between locked and unlocked positions;
   (b) locking means integral with said skirt and angularly spaced thereabout; and
   (c) a plurality of elongated grate bars arranged to be mounted on the stove, wherein each of said grate bars includes a plurality of skirt-retaining portions positioned at intervals therealong whereby a range of utensil sizes may be reasonably secured thereon.

2. The apparatus in accordance with claim 1 wherein said skirt includes an outwardly extending flange thereabout and wherein said locking means is a plurality of angular spaced notches formed in the periphery of said flange, the notches of said flange being dimensioned to freely engage said grate bar skirt-retaining portions in the unlocked position, said flange being captured by said grate bar skirt-retaining portions in the locked position.

3. The apparatus in accordance with claim 2 wherein said flange includes four equally spaced notches.

4. The apparatus in accordance with claim 2 wherein said skirt retaining portions are notches formed in the top edge of said grate bars, said notches being upwardly open and substantially L-shaped.

5. The apparatus in accordance with claim 1 wherein said locking means comprises a plurality of angularly spaced, downwardly open notches formed in said skirt, said notches being substantially L-shaped.

6. The apparatus in accordance with claim 5 wherein said skirt retaining portions are substantially U-shaped, oppositely facing transverse slots formed in the top and bottom edges of said grate bars to define areas of reduced cross section.

7. The apparatus in accordance with claim 5 wherein said L-shaped notches each have a horizontal and a vertical section each defined by opposed edges and wherein at least one edge of said horizontal section is at an angle to the opposed edge thereof.

8. The apparatus in accordance with claim 5 wherein the base of at least one of said U-shaped slots is at an angle to the base of said opposed slot.

9. The apparatus in accordance with claim 1 wherein said skirt includes an outwardly extending flange of varying cross section.

10. The apparatus in accordance with claim 9 wherein said flange is trapezoidal in cross section, said flange increasing uniformly in cross sectional area from a minimum to a maximum.

11. The apparatus in accordance with claim 9 wherein said flange is trapezoidal in cross sectional area, said flange increasing uniformly in cross sectional area in clockwise and counterclockwise directions from a minimum to a maximum.

12. The apparatus in accordance with claim 9 wherein said skirt-retaining means are open, upwardly facing notches formed in the top edge of said grate bars, said notches defining openings the volume of which are substantially equal to the cross sectional area of the corresponding portion of said flange, said notches being further defined by first and second opposed, parallel edges in a vertical plane, a base edge in a horizontal plane and contiguous with said first vertical edge, and an edge contiguous with and at an angle to said base edge and said second vertical edges, said first vertical edge, said base edge and said angularly disposed edge forming three sides of a trapezoid.

13. The apparatus in accordance with claim 1 wherein said skirt is flared outwardly and said locking means comprises a plurality of inwardly formed depressions thereon.

14. The apparatus in accordance with claim 13 wherein said skirt includes four equally spaced depressions.

15. The apparatus in accordance with claim 13 wherein said skirt retaining portions are notches formed in the top edge of said grate bars, said notches being upwardly open and adapted to freely engage said depressions in the unlocked position, said outwardly flared portions of said skirt being captured by said notches in the locked postion.

16. The apparatus in accordance with claim 13 wherein said notches are defined by a first edge in a vertical plane, a second edge opposed to and at an angle to said first edge and a third, base edge connecting said first and second edges.

17. The apparatus in accordance with claim 1 wherein said skirt is flared outwardly and said locking means comprises a plurality of outwardly extending bumps formed thereon.

18. The apparatus in accordance with claim 17 wherein said skirt-retaining portions are upwardly open notches formed in the top edge of said grate bars, said notches being defined by a first edge in a vertical plane, a second edge opposed to and at an angle to said first edge and a third, base edge connecting said first and second edges whereby the space between said first and second edges is greater at the bottom than at the top thereof.

References Cited
UNITED STATES PATENTS

| | | | |
|---|---|---|---|
| 1,583,076 | 5/1926 | Litter | 126—19.5 |
| 2,034,868 | 3/1936 | Henriksen | 220—69 |
| 2,662,753 | 12/1953 | Schwart | 248—361 X |
| 2,845,477 | 7/1958 | Kelly et al. | 220—40 |
| 2,858,958 | 11/1958 | Hawthorne et al. | 220—40 |
| 2,878,803 | 3/1959 | Del Papa | 126—24 |
| 2,997,199 | 8/1961 | Reachi | 220—69 X |

FREDERICK L. MATTESON, Jr., *Primary Examiner.*

E. G. FAVORS, *Assistant Examiner.*